United States Patent [19]

Greenhaw et al.

[11] Patent Number: 5,799,613
[45] Date of Patent: Sep. 1, 1998

[54] GALVANIZED ANIMAL CAGE FRONT AND RELATED METHOD

[75] Inventors: Robert A. Greenhaw, Decatur; Harold Seib, Hartselle, both of Ala.

[73] Assignee: CTB, Inc., Milford, Ind.

[21] Appl. No.: 725,857

[22] Filed: Oct. 4, 1996

[51] Int. Cl.⁶ ........................................ A01K 1/00
[52] U.S. Cl. ............................. 119/452; 119/481
[58] Field of Search .......................... 119/452, 453, 119/459, 472, 474, 480, 481

[56] References Cited

U.S. PATENT DOCUMENTS

| | | | |
|---|---|---|---|
| 3,593,688 | 7/1971 | Whitener | 119/453 |
| 3,771,495 | 11/1973 | Stevenson et al. | 119/480 |
| 4,140,080 | 2/1979 | Snader | 119/453 X |
| 4,762,085 | 8/1988 | Ondrasik | 119/474 |
| 5,497,728 | 3/1996 | Watanabe | 119/452 |

*Primary Examiner*—Gene Mancene
*Assistant Examiner*—Yvonne R. Abbott
*Attorney, Agent, or Firm*—Trexler, Bushnell, Giangiorgi & Blackstone, Ltd.

[57] ABSTRACT

An improved galvanized cage front for use with an animal confinement cage subjected to corrosive environments, and a method of producing same. The improved cage front is constructed of a galvanized steel mesh pattern, which mesh pattern is comprised of line wires and running wires welded together prior to receiving a zinc coating in a galvanization process. The running wires are of lesser gage steel wire than that of the line wires. The method includes the steps of forming the mesh pattern, coating the mesh pattern with a thickness of zinc and coiling the coated mesh pattern into a rolled quantity of predetermined length. No after-galvanization welding is required, and a thicker coating of zinc can be provided to mitigate environmental effects on the cage front.

19 Claims, 2 Drawing Sheets

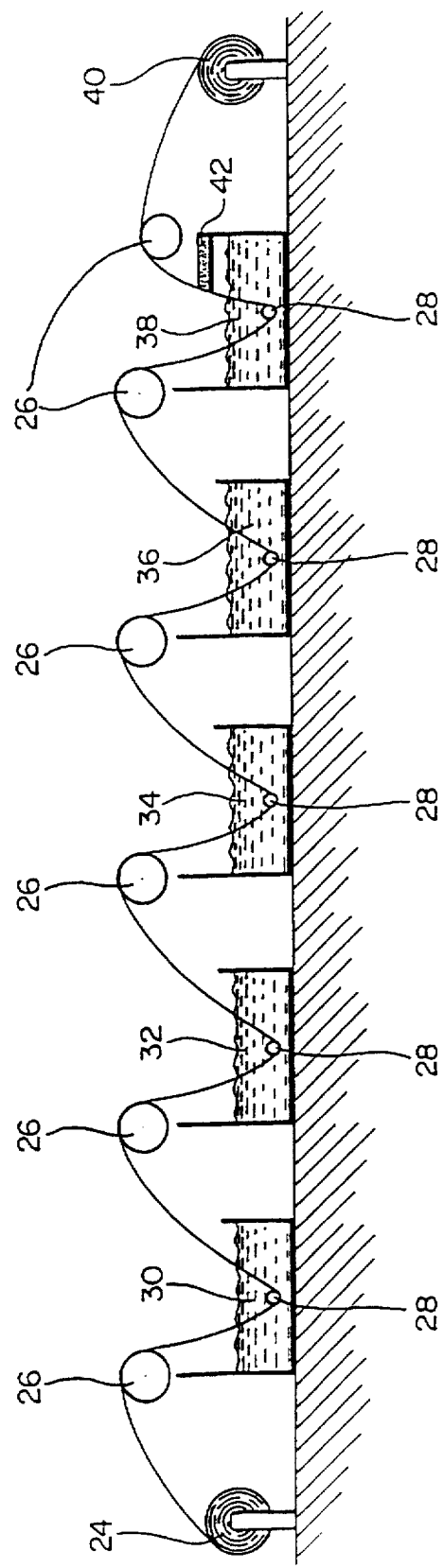

GALVANIZED ANIMAL CAGE FRONT AND RELATED METHOD

BACKGROUND OF THE INVENTION

1. Field of the Invention

In general, the present invention relates to an animal confinement cage, but more specifically, the present invention relates to the galvanized steel wire construction of a cage front for use in corrosive climates.

2. State of the Prior Art

Galvanized steel wire animal confinement cages have been in use for many years. Galvanized steel wire is used in poultry houses, for example, to protect the confinement cages from the corrosive effects of heat, humidity and other adverse aspects of the environment.

The typical confinement cage construction used in a poultry house includes a cage body and a cage front. For various reasons, the cage front is usually subjected to greater forces as compared to the cage body. As a result, the cage front is normally constructed from heavier gage steel wire than is required for the cage body construction.

Rolls of relatively light gage galvanized wire mesh used for the construction of the cage body have long been commercially available. This light gage roll mesh can be easily unrolled, flattened, cut and formed into the desired cage body configuration.

Rolls of heavier gage galvanized steel wire mesh, as would be needed for construction of the cage fronts, however, have not been commercially feasible in the past, mainly because the rigidity of heavier gage galvanized steel wire mesh makes it impractical to unroll, flatten, cut and form into cage fronts.

Therefore, cage fronts have previously been manufactured, not from a rolled supply of galvanized mesh, but rather from single strands of galvanized wire, welded together to form the mesh pattern for the cage front.

One serious disadvantage of constructing cage fronts in this manner is that the zinc coating used to galvanize the steel wire is burned off at each of the many weld points in the process of constructing the mesh. This, of course, exposes bare steel wire at these many junction points, and thereby subjects the steel wire to the adverse environmental effects, defeating the purpose of using galvanized steel wire for the cage front.

OBJECTS AND SUMMARY OF THE INVENTION

It is a general objective of the present invention to provide an improved animal confinement cage for use in corrosive environments.

It is a more specific objective of the present invention to provide a galvanized steel wire mesh, of relatively heavy gage wire for use in forming a cage front, which does not include exposed steel at the weld points between the wire forming the mesh.

It is another objective of the present invention to provide a galvanized steel wire mesh that is zinc coated in a galvanizer after being welded into a mesh, rolled up and later uncoiled and formed into a cage front.

It is yet another objective of the present invention to provide a galvanized steel wire mesh for use in construction of a cage front that includes a substantially thicker coating of zinc on the mesh than can practically be achieved by known methods.

Other objectives and advantages of the invention will become apparent upon reading the following detailed description and upon reference to the drawings. Throughout the description, like reference numerals refer to like parts.

In accordance with the foregoing objectives, and briefly stated, the present invention comprises a cage front formed of a plurality of metal wires welded together to produce a mesh capable of preventing animals from escaping the cage and withstanding applied exterior forces, the plurality of metal wires forming the cage front being of heavier gage metal than the plurality of metal wires that form a cage body with which the cage front is used, and a metal coating applied to the plurality of wires forming the cage front, after the wires have been welded together to produce the cage front mesh pattern.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following descriptions taken in connection with the accompanying drawings, in which:

FIG. 3 illustrates a method by which a rolled quantity of galvanized steel wire mesh for use in the construction of the cage front of FIG. 2 can be produced.

DETAILED DESCRIPTION OF THE PREFERRED EMBODIMENT

While the invention will be described in connection with a preferred embodiment thereof, it will be understood that it is not intended to limit the invention to that embodiment. On the contrary, it is intended to cover all alternatives, modifications and equivalents as may be included within the spirit and scope of the invention.

Figure 1:
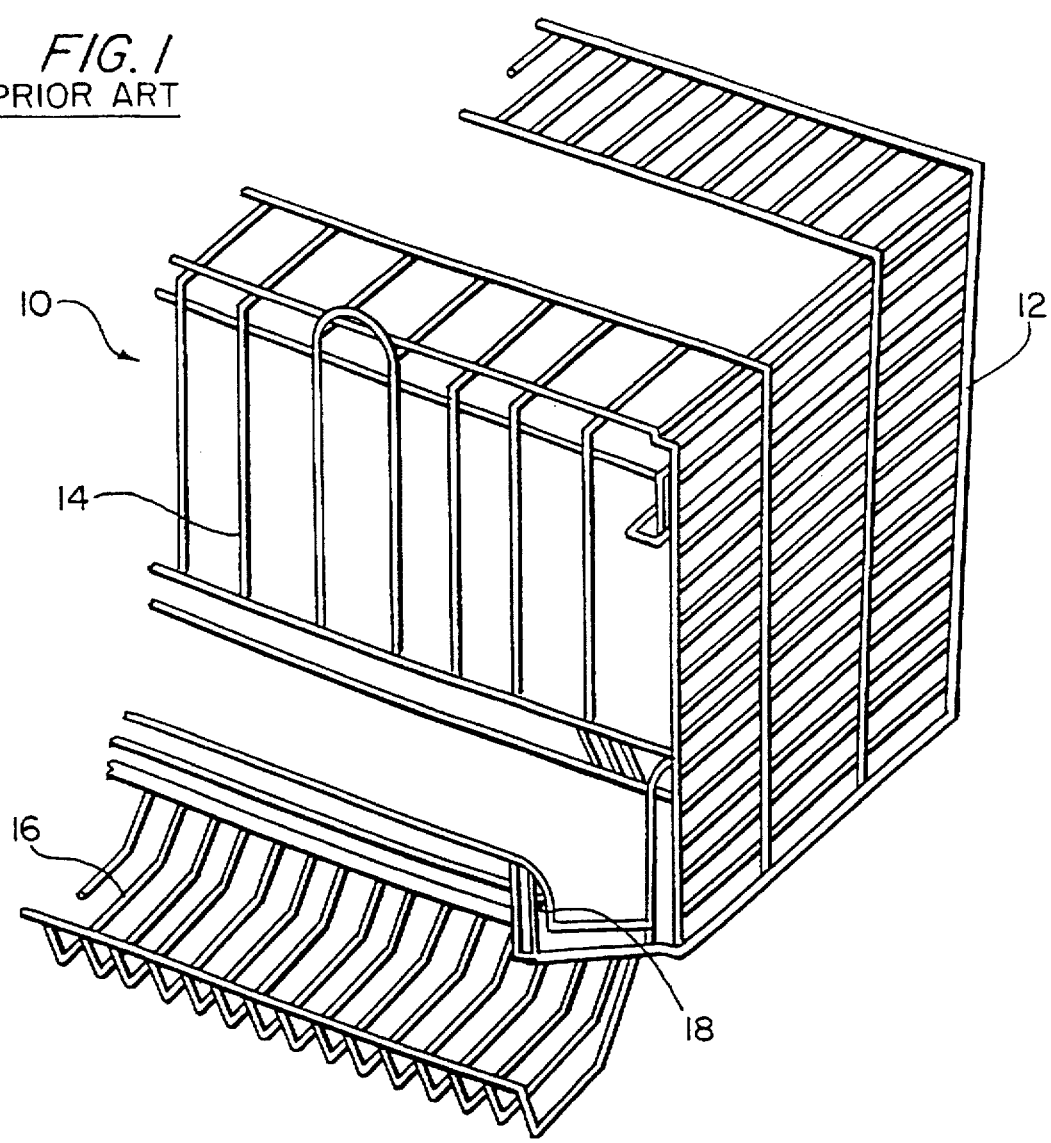
FIG. 1 illustrates a prior art animal confinement cage to which the present invention relates.

In FIG. 1, there is shown a prior art animal confinement cage 10. The cage 10 shown is but one example of the type of confinement cage with which the present invention can be used. The cage 10 includes a body 12 and cage front 14. The body 12 is typically constructed of a relatively light No. 14 gage galvanized steel wire mesh. The mesh pattern commonly forms 1"×2" openings which have been found sufficient to retain the caged animals. The wire mesh used to construct the cage body 12 is usually supplied in rolled quantities to a cage construction site. It is then unrolled, flattened, cut and shaped into the desired cage body configuration. Because of the relatively tight mesh pattern, and because the cage body is not normally subjected to significant external forces when the cage body 12 is arranged in a multi-tiered cage arrangement, for example, a No. 14 gage steel wire performs adequately for use in construction of the cage body 12.

The cage body 12 shown in FIG. 1 also includes an egg collector extension 16 formed on a lower part of the body 12. Above the egg collector extension 16 a feed trough 18 is shown mounted on the cage 10 in typical fashion.

FIG. 1 further illustrates a typical cage front 14. Like the cage body 12, the cage front 14 is usually constructed of a galvanized steel wire mesh. The mesh pattern for the cage front 14, however, generally includes larger openings to allow animals to gain access to the feed trough 18. Also unlike the cage body 12, the galvanized steel wire mesh forming the cage front 14 is commonly subjected to external forces of much more significant magnitude than the cage body 12, such as the weight forces generated by higher tiers of cages in a typical multi-tiered cage arrangement, the forces exerted on the cage front 14 by the caged animals during feeding, and the weight force of the feed trough 18, and the feed contained therein.

As a result of the foregoing, heavier No. 10 gage galvanized steel wire is usually required to construct the cage front 14 for an animal confinement cage 10. Due mainly to the rigidity of No. 10 gage steel wire, it is impractical to supply galvanized steel wire mesh for constructing a cage front 14 in rolled quantities. Such rolls cannot be uncoiled, flattened, cut and shaped to form a cage front in any reasonable manner.

Single strands of galvanized No. 10 gage steel wire, which normally is coated with zinc to a thickness of 0.0003 to 0.0005 inches, are therefore required to be welded together at the cage construction site to form the wire mesh of the cage front 14. In the process of welding the cage front 14 together by conventional means, the zinc coating is inevitably burned off the steel wire, thereby exposing bare steel wire to the environment. Prior attempts at redipping the cage fronts 14 welded in this manner have produced adverse results, such as abrasive surfaces capable of injuring the animals rubbing up against the mesh while accessing the feed trough 18.

Figure 2:
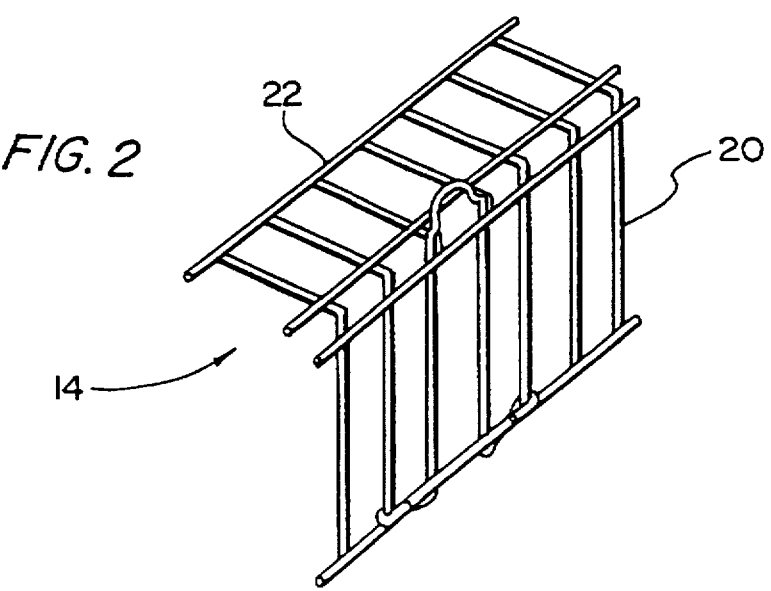
FIG. 2 illustrates a cage front component made in accordance with the teachings of the present invention.

In accordance with a principle advantage of the present invention, FIG. 2 illustrates a cage front 14 which has been zinc coated in a galvanization method, after being welded together into a cage front 14 mesh pattern. In the unique design shown, the cage front 14 includes line wires 20, vertically oriented in FIG. 2, and running wires 22, horizontally oriented in FIG. 2. Importantly, while the line wires 20 are manufactured from heavier No. 10 gage steel wire as noted above, the running wires 22 are manufactured from less-rigid No. 12 gage steel wire. It has been discovered that by constructing the cage front 14 in this manner, the cage front 14 can meet the performance capabilities required, and can also be supplied in rolled quantities produced in a galvanization process, as outlined below. The less-rigid No. 12 gage running wires 22 allow the rolled quantities to be uncoiled, flattened, cut and sized in a practical manner, and no after-galvanization welding is required. This eliminates bare spots and minimizes the effects of the corrosive environment within which the cage fronts are used. It should be noted that the relative thickness of the various gages of wires shown in the figures are not to scale, but rather are only shown for purposes of illustrating the inventive concepts disclosed and claimed herein.

In addition, galvanizing the cage front 14 as described below allows a significantly thicker coating of zinc to be deposited thereon. This further mitigates the adverse environmental effects on the cage front 14.

FIG. 3 outlines a galvanization process for the unique cage front 14 design illustrated in FIG. 2. A bare steel wire mesh pattern 24 is uncoiled and travels over sprockets 26 and is lead by rollers 28 first through a degreasing tank 30, then through a water rinse 32, then through a muriatic acid bath 34, another rinse tank 36, into a zinc vat galvanizer 38, and coiled up into a rolled quantity 40. Immediately after leaving the zinc vat 38, and before being coiled into a roll 40, the steel wire mesh is run over a charcoal wipe 42 to remove excess zinc.

This process deposits a relatively thick coating of zinc onto the already-welded steel wire mesh in a form ready to be unrolled, flattened, cut and shaped into finished cage fronts 14 for use in the many corrosive environments where needed. The coating of zinc is generally uniform over the mesh, on the order of approximately 0.0012 inches thick subject to some variance, and typically thicker at the junction points of the individual wires forming the mesh.

The invention is claimed as follows:

1. A cage front forming part of an animal confinement cage, said animal confinement cage also including a cage body, said cage front and said cage body each including a plurality of metal wires welded together to form a mesh capable of preventing animals from escaping the confinement cage, the plurality of metal wires forming said cage front being of heavier gage metal than the plurality of metal wires forming said cage body, and a metal coating applied to said wires forming said cage front, after said wires have been welded together to form the mesh cage front.

2. An invention recited in claim 1, wherein the plurality of metal wires forming the cage front further comprise running wires and line wires, said running wires being oriented substantially perpendicular to said line wires, and said line wires being of heavier gage than said running wires.

3. The invention recited in claim 2, wherein the running wires are No. 12 gage steel wire.

4. The invention recited in claim 2, wherein the line wires are No. 10 gage steel wire.

5. The invention recited in claim 1, wherein at least some of the plurality of metal wires forming the cage front are No. 10 gage steel wire.

6. The invention recited in claim 1, wherein the plurality of wires forming the cage body are No. 14 gage steel wire.

7. The invention recited in claim 1, wherein the metal coating applied to the plurality of wires forming said cage front is zinc.

8. The invention recited in claim 7, wherein the thickness of the zinc coating is, generally, approximately 0.0012 inches.

9. The invention recited in claim 1, wherein the thickness of the metal coating at points where the plurality of metal wires are welded together is greater than or equal to the thickness of the metal coating elsewhere along the wires.

10. A method of manufacturing a relatively heavy gage wire mesh pattern for use as a cage front for an animal confinement cage, said relatively heavy gage wire mesh compared to a relatively light gage wire mesh used to form a cage body fastened to said cage front, the method of manufacturing comprising the steps of: welding relatively heavy gage steel wire together to form a wire mesh pattern capable of preventing animals from escaping said confinement cage; coating said wire mesh pattern with a metal anti-corrosive layer over the entire extent of the wire mesh pattern; coiling the coated mesh pattern into a rolled quantity of predetermined length; and, thereafter, unrolling, cutting and forming the wire mesh pattern into a predetermined size and shape to form said cage front.

11. The method of manufacturing recited in claim 10, wherein at least some of the relatively heavy gage wire is No. 10 gage steel wire.

12. The method of manufacturing as recited in claim 10, wherein the relatively light gage wire mesh is No. 14 gage steel wire.

13. The method of manufacturing as recited in claim 10, wherein the step of welding further comprises welding running wires to line wires, said running wires being substantially perpendicular to said line wires.

14. The method of manufacturing as recited in claim 13, wherein the running wires are formed of No. 12 gage steel wire.

15. The method of manufacturing as recited in claim 13, wherein the line wires are formed of No. 10 gage steel wire.

16. The method of manufacturing as recited in claim 13, wherein the coating step deposits an equal or greater amount of anticorrosive layer on the wire mesh pattern at points of intersection between the running wires and the line wires.

17. The method of manufacturing as recited in claim 10, wherein the coating is zinc.

18. The method of manufacturing as recited in claim 17, wherein the zinc coating is, generally, approximately 0.0012 inches thick.

19. The method of manufacturing as recited in claim 10, wherein the coating step further comprises cleaning the steel wire, rinsing the steel wire, and applying acid to the steel wire prior to coating the steel wire with zinc.

* * * * *